(12) United States Patent
Sun et al.

(10) Patent No.: US 9,322,393 B2
(45) Date of Patent: Apr. 26, 2016

(54) WIND POWER GENERATION DEVICE

(75) Inventors: Lirong Sun, Shanghai (CN); Xiping Hua, Shanghai (CN); Xinhua Yu, Shanghai (CN); Xiaojuan Shi, Shanghai (CN); Yun Sun, Shanghai (CN); Pingbao Chen, Shanghai (CN)

(73) Assignee: Lirong Sun, Shanghai (CN)

( * ) Notice: Subject to any disclaimer, the term of this patent is extended or adjusted under 35 U.S.C. 154(b) by 0 days.

(21) Appl. No.: 14/391,526

(22) PCT Filed: Apr. 22, 2012

(86) PCT No.: PCT/CN2012/074493
§ 371 (c)(1),
(2), (4) Date: Oct. 9, 2014

(87) PCT Pub. No.: WO2013/152522
PCT Pub. Date: Oct. 17, 2013

(65) Prior Publication Data
US 2015/0086380 A1    Mar. 26, 2015

(30) Foreign Application Priority Data
Apr. 10, 2012  (CN) .......................... 2012 1 0103670

(51) Int. Cl.
| F03D 3/04 | (2006.01) |
| F03D 3/00 | (2006.01) |
| F03D 9/00 | (2006.01) |
| F03D 11/02 | (2006.01) |

(52) U.S. Cl.
CPC .............. *F03D 3/005* (2013.01); *F03D 3/0409* (2013.01); *F03D 9/002* (2013.01); *F03D 11/02* (2013.01); *F05B 2240/132* (2013.01); *F05B 2240/211* (2013.01); *F05B 2250/25* (2013.01); *Y02E 10/74* (2013.01)

(58) Field of Classification Search
None
See application file for complete search history.

(56) References Cited

U.S. PATENT DOCUMENTS

| 4,452,046 A * | 6/1984 | Valentin .................... F03D 1/04 290/55 |
| 6,800,955 B2 * | 10/2004 | McDavid, Jr. ............ F03D 1/04 290/43 |

FOREIGN PATENT DOCUMENTS

| CN | 101074650 | 11/2007 |
| CN | 201321951 | 10/2009 |
| CN | 101737260 | 6/2010 |
| CN | 201502488 | 6/2010 |
| CN | 201751574 | 2/2011 |
| CN | 102022277 | 4/2011 |

(Continued)

*Primary Examiner* — Dwayne J White
*Assistant Examiner* — Justin Seabe
(74) *Attorney, Agent, or Firm* — Hamre, Schumann, Mueller & Larson, P.C.

(57) ABSTRACT

A wind power generation device, comprising a base (1), a wind concentrating tower (2), a vertical generator (3), a vertical spiral turbine (4), a turbine air inlet duct (5), a trumpet-shaped wind pushing duct (6) and an umbrella-shaped wind drawing duct (7). The wind concentrating tower concentrates the wind, the trumpet-shaped wind pushing duct pushes the wind, and the umbrella-shaped wind drawing duct draws the wind to form an artificial tornado, generate a low air pressure in the center, and generate a great drawing and pushing force to the turbine, thus driving the vertical spiral turbine to drive the vertical generator to generate power. The wind power generation device achieves wind power generation of large installed capacity.

9 Claims, 3 Drawing Sheets

(56) References Cited

FOREIGN PATENT DOCUMENTS

| CN | 102155346 | 8/2011 |
| CN | 201963483 | 9/2011 |
| CN | 102562467 | 7/2012 |

* cited by examiner

WIND POWER GENERATION DEVICE

BACKGROUND OF THE INVENTION

1. Technical Field

The present invention relates to a power generation device, in particular to a wind power generation device.

2. Description of Related Art

Clean energy sources have become an irresistible trend of the worldwide energy sources development. Completely replacing coal-fired power generation will realize energy source revolution.

At present, the installed capacity of the domestic power generator is 1 billion KW, wherein coal-fired power generators account for 77%, firing 3.1 billion t coal every year. In recent years, the new installed capacity at home approaches 0.1 billion KW every year with a total investment of RMB 500 billion Yuan, and is expected to reach 1.9 billion KW in 2020. According to the current development trend, the energy consumption will be increased by three times in 2050 while the installed capacity will reach 3 billion KW, and 10 billion t coals are needed every year, which will seriously affect the environment and change the world climate and bring catastrophic disasters.

How could human being achieve clean energy sources? To completely replace the coal-fired power generation, clean energy sources must reach the technical level of the coal-fired power generation: for example, the minimum installed capacity of the current coal-fired power generators is 300,000 KW, and those generators can stably generate electricity at 50 Hz for 5,500 h, so the investment and production cost of the power generation by clean energy sources shall be equivalent to that of the coal-fired power generation.

The radiation energy of the hydrogen nuclear fusion thermonuclear reaction of the sun reaching the earth only accounts for 1/200,000 of the total solar energy, equivalent to firing 200,000 billion t coals each year, and capable of being used for 6 billion years. Solar energy is in endless supply. The nuclear fusion power generation is also certainly a development trend, but needs a very long time to study. With an investment of 1.6 billion USD, the total installed capacity of the most advanced focusing solar power generator CSP produced by US. BrightSource Energy reaches 392 MW. The power generation investment is 29,500 USD/KW, which is five times that of the coal-fired power generation. Now, America is building a 800 m high tower with an installed capacity of 200 MW. The total investment is 0.5 billion USD, namely 63,300 USD/KW. However, it is impossible to popularize such high tower. Solar power generation has low efficiency, and the effective power generation time is only 2,000 h. Switzerland built a space power generation station using thin film solar cells. This station has an investment of 17 billion USD for 1,000 MW installed capacity, namely a 120,000 USD/KW power generation investment, which is 22 times that of the coal-fired power generation. Wind is generated by the temperature difference of the day and night. The horizontal axial wind is regarded as the most technologically mature clean energy sources with the biggest prospect. With the vigorous support of all countries in the world, the wind power generation stations still account for a very small ratio in the power generation field in 123 years since the invention. Obviously, wind power generation has fatal defects. The exclusive way for the wind power generation to replace the coal-fired power generation is that human beings realize automatic control over the energy, pressure, speed, direction, volume and even density of the natural wind.

The present invention achieves substantial significant technical breakthrough on the basis of the original "Wind-gathering and Speed-increasing Wind Power Generation Device (Application No.: 201010619068X).

BRIEF SUMMARY OF THE INVENTION

The objective of the present invention is to provide a wind power generation device which uses the inexhaustible wind energy to form pulling airflow by the wind-gathering and speed-increasing method to generate tornadoes, thus realizing large-installed-capacity wind power generation at a high wind speed, obtaining low-priced clean energy sources and replacing the coal-fired power generation.

The technical solution of the present invention is as follows: A wind power generation device comprises:

a base;

a wind gathering tower, installed on the base, structured as a radial frame, internally provided with a cavity running through up and down, the cavity wall being peripherally provided with a plurality of wind gathering doors which can only be opened inwards;

a vertical power generator, disposed at the bottom in the cavity of the wind gathering tower and installed at the base, a driving shaft thereof axially extending upward and outside;

a vertical spiral turbine, installed above the vertical power generator, comprising upper turbine blades, a lower inertia wheel and a crankshaft connecting the turbine blades and the inertia wheel, the lower end of the crankshaft penetrating through the inertia wheel and being in drive connection with the upward extending driving shaft of the vertical power generator, an air outlet of the vertical spiral turbine being upward;

a turbine air-intake barrel, installed on the base at the bottom in the cavity of the wind gathering tower, embracing the vertical power generator and the vertical spiral turbine inside, the middle part thereof being provided with an air inlet that is connected with the turbine blades, and the lower part being provided with a crosswise support plate between the vertical power generator and the inertia wheel of the vertical spiral turbine;

a horn-shaped wind guiding barrel, disposed in the central position in the cavity of the wind gathering tower, an upper opening of the horn-shaped wind guiding barrel being closely connected with an upper opening of the wind gathering tower, a lower opening being integrally connected with the turbine air-intake barrel, a wind gathering channel being formed between the integrated piece of the horn-shaped wind guiding barrel and the turbine air-intake barrel and the wind gathering tower, the lower part of the wind gathering channel being connected with the air inlet of the turbine air-intake barrel; and, an umbrella-shaped wind pumping barrel, connected above the horn-shaped wind guiding barrel, comprising a frame structure integrally connected with the wind gathering tower and a cone body which is disposed in the frame structure and has at least one hollow layer, the conical surface of the cone body being provided with a plurality of wind pumping doors which can only be opened outward, and the bottom edge of the cone body being provided or not provided with suction openings or exhaust outlets in the vertical direction.

The middle part of the wind gathering channel is peripherally provided with spiral wind deflectors.

The air inlet of the turbine air-intake barrel is provided with an automatic air regulating door for regulating the size of the air inlet.

The vertical spiral turbine is connected with the turbine air-intake barrel in a magnetic suspension way through magnetic suspension mechanisms.

The height of the horn-shaped wind guiding barrel is greater than the diameter of the upper opening of the horn-shaped wind guiding barrel; the lower part of the horn-shaped wind guiding barrel is provided with spiral wind deflectors; and the middle and upper parts are provided with wing-shaped wind deflectors.

The outer circumference of the cavity wall of the wind gathering tower is provided with a plurality of wind gathering cavities embraced by vertical wind baffles and horizontal wind baffles; and the cavity walls of each wind gathering cavity are provided with a plurality of wind gathering doors that can only be opened inward.

The outer circumference of the conical surface of the umbrella-shaped wind pumping barrel is provided with a plurality of vertical wind baffles at intervals, while the bottom surface is provided with horizontal wind baffles; air pumping cavities are formed between adjacent vertical wind baffles; and the conical surfaces in each air pumping cavity are formed with a plurality of wind pumping doors that can only be opened outward.

The magnetic suspension mechanisms include one axial magnetic suspension mechanism and at least two radial magnetic suspension mechanisms; the axial magnetic suspension mechanism is disposed between the vertical spiral turbine and the crosswise support plate of the turbine air-intake barrel; the radial magnetic suspension mechanisms are respectively disposed on the inner wall of the turbine air-intake barrel and between the turbine blades; each magnetic suspension mechanism comprises two sets of corresponding magnetic suspension components; the two of corresponding magnetic suspension components are inserted into each other in a non-contact way and are arrayed in the magnetic balance principle.

The upper part of the wind gathering tower is provided with a conical surface; the upper part of the wind gathering channel is provided with a horn-shaped air baffle ring; the upper opening of the horn-shaped air baffle ring is connected with the cavity wall of the wind gathering tower in a sealing way, and the lower opening of the horn-shaped air baffle ring is connected with the outer wall of the horn-shaped wind guiding barrel in a sealing way.

The automatic air regulating door includes an upper air regulating door and a lower air regulating door; the upper air regulating door is installed above the air inlet of the turbine air-intake barrel; the lower air regulating door is installed below the air inlet of the turbine air-intake barrel; the upper air regulating door and the lower air regulating door move in the same direction or in the opposite directions at the same time by the effect of a control mechanism to realize regulation on the size of the air inlet and further realize regulation on the air volume.

The present invention employs the wind gathering tower to gather wind, uses the horn-shaped air barrel to guide the wind and the umbrella-shaped wind pumping barrel to pump air, thus forming manmade tornadoes and generating a low pressure in the centre to generate a huge force for pulling the turbine. Thus, the vertical spiral turbine is pulled to drive the power generator to generate electricity, realizing a large installed capacity.

When the wind gathering tower is wider than 100 m and higher than 200 m, the wind speed of the turbine air-intake barrel will increase by over 10 times, capable of driving a 300 MW vertical power generator to generate electricity and completely reaching the level of the coal-fired power generator. Moreover, the investment cost is equivalent to that of the coal-fired power generator, but the production cost is greatly reduced, so the production and management personnel are also greatly reduced. In comparison with power generator devices of the same scale, the device provided by the present invention can save 510,000 t standard coal each year, reduce 1,400,000 t $CO_2$ emission, and save 460,000 t water. The majority of coastal regions in the world feature dense population, developed industries and rich wind energy resources and can realize self-sufficiency in wind power supply, thus greatly reducing the power transmission cost. It is the most efficient way to solve the energy shortage for human beings.

DETAILED DESCRIPTION OF THE INVENTION

Figure 1:
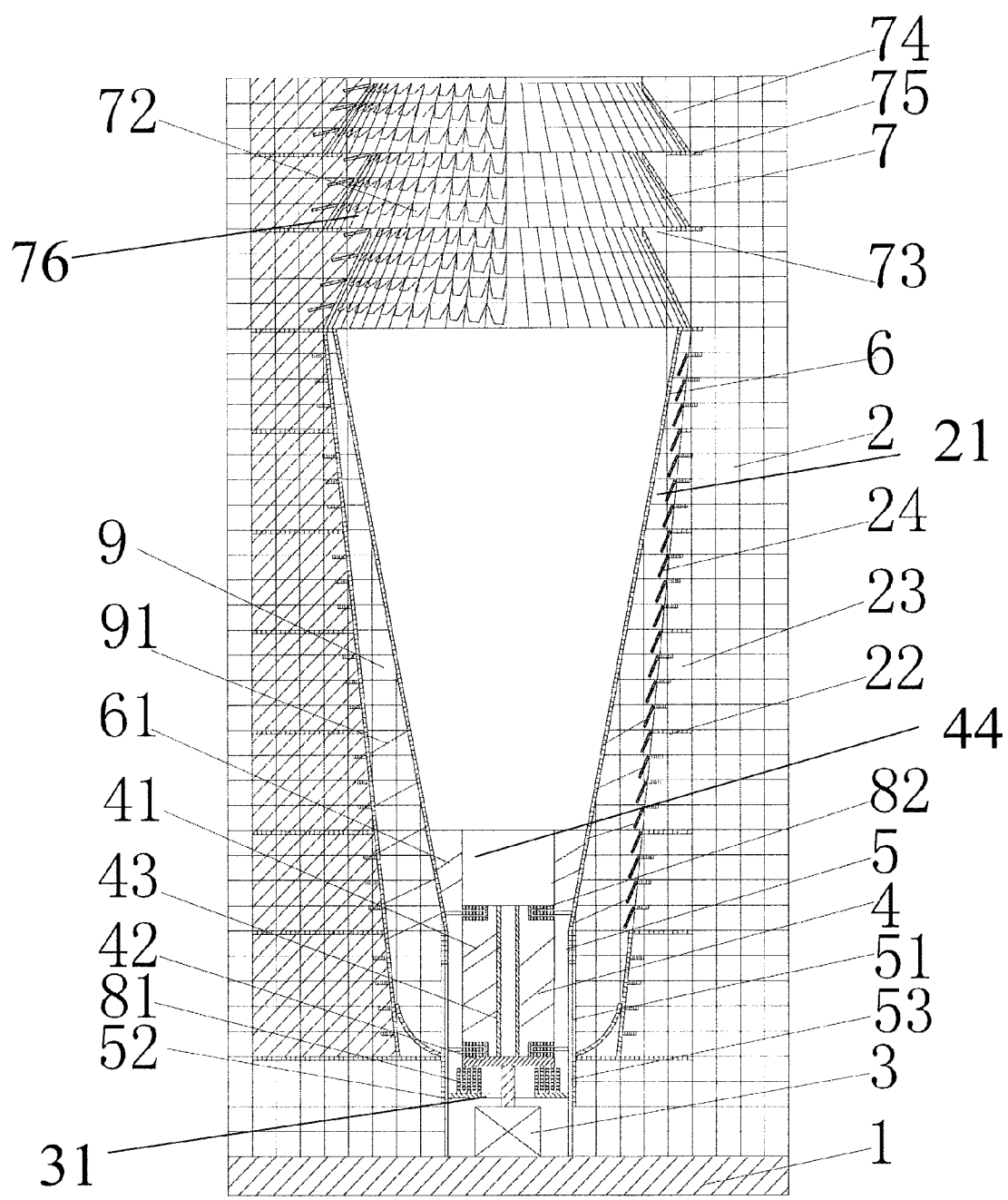
FIG. 1 is a longitudinal sectional view of the wind power generation device of the present invention in the first embodiment.

The figures illustrate two preferable embodiments of the present invention. The present invention is described in further detail with reference to the embodiments.

Refer to FIG. 1, FIG. 2, FIG. 3 and FIG. 4. The wind power generation device of the present invention includes a base 1, a wind gathering tower 2, a vertical power generator 3, a vertical spiral turbine 4, a turbine air-intake barrel 5, a horn-shaped wind guiding barrel 6 and an umbrella-shaped wind pumping barrel 7.

The wind gathering tower 2 is installed on the base 1, has a radial frame structure, and is internally provided with a cavity that runs through up and down. The outer circumference of the cavity wall of the wind gathering tower is provided with a plurality of wind gathering cavities 23 surrounded by vertical wind baffles 21 and vertical wind baffles 22. The cavity walls in each wind gathering cavity are provided with a plurality of wind gathering doors 24 that can only be opened inward. The wind gathering doors 24 may be wind gathering doors that are installed through a horizontal shaft and are opened and closed vertically or wind gathering doors that are installed through an inclined shaft and are opened or closely horizontally.

Figure 2:
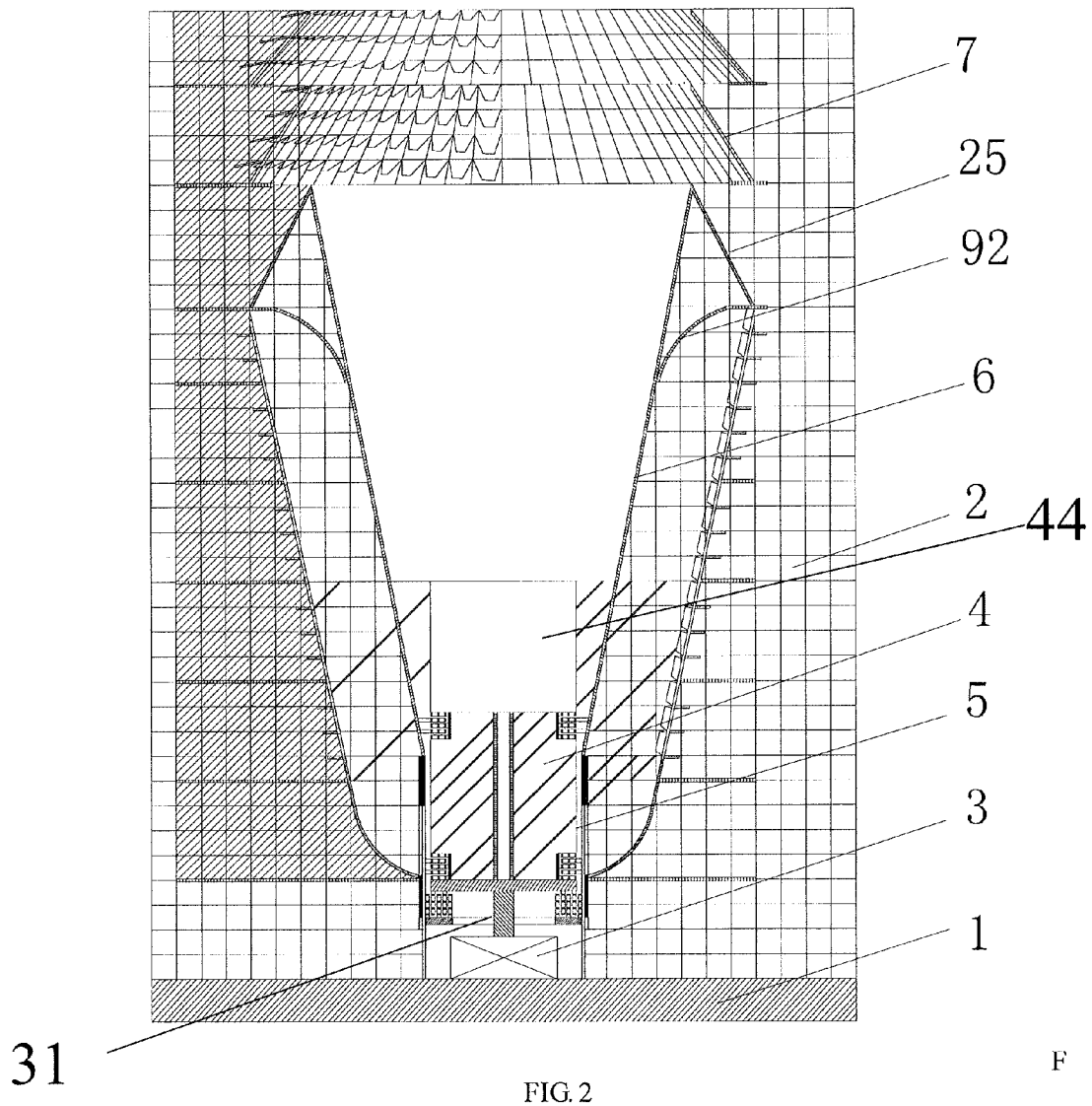
FIG. 2 is a longitudinal sectional view of the wind power generation device of the present invention in the second embodiment.
Figure 3:
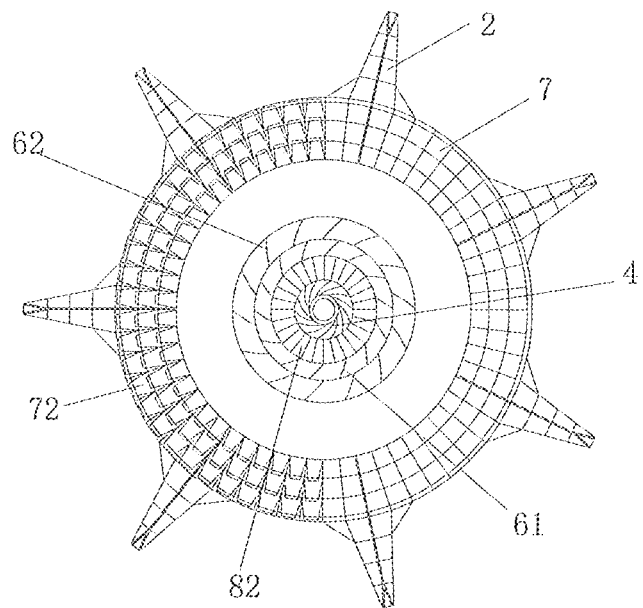
FIG. 3 is a vertical view of the wind power generation device of the present invention.
Figure 4:
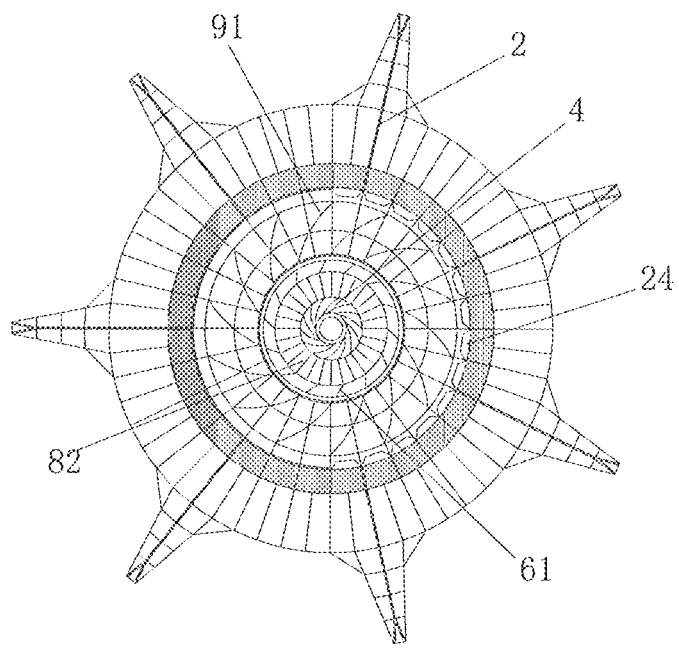
FIG. 4 is a crosswise sectional view of the bottom of FIG. 1.

Refer to FIG. 2. According to the invention, the upper part of the wind gathering tower 2 be provided with a conical surface 25; the upper part of the wind gathering channel 9 is provided with a horn-shaped air baffle ring 92; the upper opening of the horn-shaped air baffle ring is connected with the cavity wall of the wind gathering tower 2 in a sealing way, and the lower opening of the horn-shaped air baffle ring is connected with the outer wall of the horn-shaped wind guiding barrel 6 in a sealing way.

The vertical power generator 3 is a water turbine vertical power generator available on the market, disposed at the bottom in the cavity of the wind gathering tower and installed on the base 1, and the driving shaft thereof axially extends out to be connected with the vertical spiral turbine 4.

The vertical spiral turbine 4 is installed above the vertical power generator 3, comprising upper turbine blades 41, a lower inertia wheel 42 and a crankshaft 43 connecting the turbine blades and the inertia wheel. The lower end of the crankshaft 43 penetrates through the inertia wheel and is in drive connection with the upward extending driving 31 shaft of the vertical power generator. The air outlet of the vertical spiral turbine is upward. The vertical spiral turbine is connected with the turbine air-intake barrel 5 in a magnetic suspension way through an axial magnetic suspension mechanism 81 and at least two rail magnetic suspension mechanisms 82. The axial magnetic suspension mechanism 81 is disposed between the vertical spiral turbine 4 and the crosswise support plate of the turbine air-intake barrel 5; the two rail magnetic suspension mechanisms 82 are respectively disposed between the inner wall of the turbine air-intake barrel 5 and the turbine blades; each magnetic suspension mechanism comprises two sets of corresponding magnetic suspension components; and the two sets of magnetic suspension components are inserted into each other in a non-contact way and are arrayed in a magnetic balance principle. The spiral turbine is a large device, and the main shaft may be structured as one piece or two or more segments; shafts are connected in sucking or mechanical way through keyway magnetic gears; each segment of the shaft employs a radial magnetic suspension structure; and the spiral blades are movably connected.

The turbine air-intake barrel 5 is installed on the base 1 at the bottom in the cavity of the wind gathering tower and embraces the vertical power generator 3 and the vertical spiral turbine 4 inside; the middle part of the turbine air-intake barrel is provided with an air inlet 51 connecting with the turbine blades, and the lower part is provided with a crosswise support plate 52 between the vertical power generator and the inertia wheel of the vertical spiral turbine. The air inlet 51 of the turbine air-intake barrel is provided with an automatic regulating door 53 for regulating the size of the air inlet. The automatic regulating door 53 includes an upper air regulating door and a lower regulating door, capable of moving towards the middle from the upper and lower directions to regulate the size of the air inlet and therefore regulating the volume of the air inflow.

The horn-shaped wind guiding barrel 6 is disposed in the central position in the cavity of the wind gathering tower. The upper opening of the horn-shaped wind guiding barrel is connected with the upper opening of the wind gathering tower 2 in a sealing way, and the lower opening is integrally connected with the turbine air-intake barrel 5. A wind gathering channel 9 is formed between the integrated piece of the horn-shaped wind guiding barrel and the turbine air-intake barrel and the wind gathering tower, and the lower part of the wind gathering channel 9 is connected with the air inlet 51 of the turbine air-intake barrel. The middle part of the wind gathering channel 9 is circumferentially provided with spiral wind deflectors 91. The height of the horn-shaped wind guiding barrel 6 is greater than the diameter of the upper opening of the horn-shaped wind guiding barrel; the lower part of the horn-shaped wind guiding barrel 6 is provided with spiral wind deflectors 61; and the middle and upper parts are provided with wing-shaped wind deflectors 62 (see FIG. 3).

The umbrella-shaped wind pumping barrel 7 is connected above the horn-shaped wind guiding barrel 6, comprising a frame structure integrally connected with the wind gathering tower and a cone body that is disposed in the frame structure and has at least one hollow layer; the conical surface of the cone body is provided with a plurality of wind pumping doors 72 that can only be opened outward, and the bottom edge of the cone body is provided or not provided with suction openings or exhaust outlets 73 in vertical direction (as shown in FIG. 1, the bottom edge of the cone body on the first layer is closed and has no suction opening or exhaust outlet, while the bottom edges of the cone bodies on the second or third layers are provided with suction openings or exhaust outlets in the vertical direction; the suction opening or exhaust outlet is the same opening which is the suction opening on the windward side and the exhaust outlet on the leeside). The outer circumference of the conical surface of the umbrella-shaped wind pumping barrel 7 is provided with a plurality of vertical wind baffles 74 at intervals, while the bottom surface is provided with horizontal wind baffles 75; air pumping cavities 76 are formed between adjacent vertical wind baffles; and the conical surface in each air pumping cavity is formed with a plurality of wind pumping doors 72 that can only be opened outward. The wind pumping doors 72 may be the wind pumping doors which are installed through a horizontal shaft and opened in the vertical direction or the wind pumping doors which are installed through an inclined shaft and opened in the horizontal direction.

The working principle of the present invention is: the natural wind enters the wind gathering cavities on the windward side of the wind gathering tower, opens the wind gathering doors (the wind gathering doors on the leeside are automatically closed by the effect of the its own weight and the wind pressure), then enters the wind gathering channel. In such circumstances, a positive pressure greater than the natural wind is formed in the wind gathering channel. The airflow in the wind gathering channel is guided by the spiral wind deflectors to enter the air inlet of the turbine air-intake barrel to drive the turbine blades.

The umbrella-shaped wind pumping barrel is located on the top of the horn-shaped wind guiding barrel and the wind gathering tower. The present invention is a power generation device with a large installed capacity, which is one or several hundred meters high. At this altitude, the natural wind is merely affected by the ground, and the wind speed gets steady and is far greater than that of the wind 10 m higher than the ground. By the effect of the vertical wind baffles and the bottom horizontal wind baffles, the natural wind at high altitude enters the umbrella-shaped wind pumping barrel along the air pumping openings below the umbrella-shaped wind pumping barrel, gathers upward, and speeds up at the ceiling of the cone body on each layer. According to the Bernoulli equation $P+0.5\rho V2$=Constant (P: air pressure; $\rho$: air density; V: wind speed), the wind speed increases while the air pressure must decline on condition of unchanged air density, thus generating an upward lifting force and a low air pressure. The wind-gathering channel forms positive-pressure; the umbrella-shaped wind pumping barrel and the horn-shaped wind guiding barrel are combined together to generate low-pressure guided wind and form a high-rate airflow, thus driving the turbine to rotate from two directions and then driving the power generator to generate electricity.

The wind gathering channel and the horn-shaped wind guiding barrel are both provided with wind deflectors. The high-rate airflow passes through the wind deflectors and then is inevitably changed into the rotary wind. The diameter of the exhaust opening of the horn-shaped wind guiding barrel is multiples of that of the air inlet. According to the conservation of angular momentum, mass×radius×angular speed=constant, it is know that, on condition of basically unchanged air density in the horn-shaped wind guiding barrel, the angular speed of the wind increases continuously when the diameter of the horn-shaped barrel decreases continuously along the downward direction, so the air inlet of the horn-shaped barrel forms tornadoes. The tornadoes rotating at a high speed reduce the air pressure of the rotary center, which increases the airflow differential and forms bigger tornadoes. In this way, the rotary center generates a low vacuum state and a very huge pulling force to drive the spiral turbine. At this moment, the air regulating device located outside the turbine air-intake barrel works to make the spiral turbine reach the rated rotation speed, while the inertia wheel and the spiral turbine blades are in the magnetic suspending state, so the spiral turbine runs stably and ensures 50 Hz grid connection frequency. When the wind speed increases by 10 and 15 times, the power generator power will increase by 1,000 and 3,000 times, enough to reach the installed capacity of the existing coal-fired power generator.

What is claimed is:

1. A wind power generation device, comprising:
    a base;
    a wind gathering tower, installed on the base, structured as a radial frame, internally provided with a cavity running through up and down, the cavity wall being circumferentially provided with a plurality of wind gathering doors which can only be opened inwards;
    a vertical power generator, disposed at a bottom in the cavity of the wind gathering tower and installed at the base, a driving shaft thereof axially extending upward and outside;
    a vertical spiral turbine, installed above the vertical power generator, comprising upper turbine blades, a lower inertia wheel and a crankshaft connecting the turbine blades and the inertia wheel, a lower end of the crankshaft penetrating through the inertia wheel and being in drive connection with the upward extending driving shaft of the vertical power generator, an air outlet of the vertical spiral turbine being upward;
    a turbine air-intake barrel, installed on the base at a bottom in the cavity of the wind gathering tower, embracing the vertical power generator and the vertical spiral turbine inside, a middle part thereof being provided with an air inlet that is connected with the turbine blades, and a lower part being provided with a crosswise support plate between the vertical power generator and the inertia wheel of the vertical spiral turbine;
    a wind guiding barrel, disposed in a central position in the cavity of the wind gathering tower, an upper opening of the wind guiding barrel being closely connected with an upper opening of the wind gathering tower, a lower opening of the wind guiding barrel being integrally connected with the turbine air-intake barrel, wherein the height of the wind guiding barrel is greater than the diameter of the upper opening of the wind guiding barrel;
    a wind gathering channel being formed between the integrated piece of the wind guiding barrel and the turbine air-intake barrel and the wind gathering tower, a lower part of the wind gathering channel being connected with the air inlet of the turbine air-intake barrel; and,
    a wind pumping barrel having a first conical surface, connected above the wind guiding barrel, comprising a frame structure integrally connected with the wind gathering tower and a cone body which is disposed in the frame structure and has at least one hollow layer, the first conical surface of the cone body being provided with a plurality of wind pumping doors that can only be opened outward, the outer circumference of the first conical surface of the wind pumping barrel is provided with a plurality of vertical wind baffles at intervals, while a bottom surface of the wind pumping barrel is provided with horizontal wind baffles; and air pumping cavities are formed between adjacent vertical wind baffles and the bottom edge of the cone body being provided with suction openings or exhaust outlets in the vertical direction.

2. The wind power generation device according to claim 1, wherein a middle part of the wind gathering channel is circumferentially provided with spiral wind deflectors.

3. The wind power generation device according to claim 1, wherein the air inlet of the turbine air-intake barrel is provided with an automatic air regulating door for regulating the size of the air inlet.

4. The wind power generation device according to claim 1, wherein the vertical spiral turbine is connected with the turbine air-intake barrel in a magnetic suspension way through magnetic suspension mechanisms.

5. The wind power generation device according to claim 1, wherein a lower part of the wind guiding barrel is provided with spiral wind deflectors; and a middle and upper parts of the wind guiding barrel are provided with wing-shaped wind deflectors.

6. The wind power generation device according to claim 1, wherein the outer circumference of a cavity wall of the wind gathering tower is provided with a plurality of wind gathering cavities surrounded by vertical wind baffles and horizontal wind baffles.

7. The wind power generation device according to claim 4, wherein the magnetic suspension mechanisms include one axial magnetic suspension mechanism and at least two radial magnetic suspension mechanisms; the axial magnetic suspension mechanism is disposed between the vertical spiral turbine and the crosswise support plate of the turbine air-intake barrel; the radial magnetic suspension mechanisms are respectively disposed between an inner wall of the turbine air-intake barrel and the turbine blades; each magnetic suspension mechanism comprises two sets of corresponding magnetic suspension components; the two of corresponding magnetic suspension components are inserted into each other in a non-contact way and are arrayed in the magnetic balance principle.

8. The wind power generation device according to claim 1, wherein an upper part of the wind gathering tower is provided with a second conical surface; an upper part of the wind gathering channel is provided with an air baffle ring; an upper opening of the air baffle ring is connected with a cavity wall of the wind gathering tower in a sealing way, and a lower opening of the air baffle ring is connected with an outer wall of the wind guiding barrel in a sealing way.

9. The wind power generation device according to claim 3, wherein the automatic air regulating door is configured to be capable of moving towards the middle from an upper and a lower direction to regulate the size of the air inlet for regulating the volume of air inflow.

* * * * *